United States Patent [19]

Braden et al.

[11] Patent Number: 4,794,139
[45] Date of Patent: Dec. 27, 1988

[54] THIXOTROPIC THICKENING AGENT FOR AQUEOUS SYSTEMS

[75] Inventors: Jennifer T. Braden, Stow; Gary L. Burroway, Doylestown; Herbert L. Bullard, Norton; Donald A. Tedeschi, Uniontown, all of Ohio

[73] Assignee: The Goodyear Tire & Rubber Company, Akron, Ohio

[21] Appl. No.: 910,054

[22] Filed: Sep. 22, 1986

[51] Int. Cl.$^4$ ............................................. C08L 37/00
[52] U.S. Cl. ...................... 524/117; 524/522; 524/555; 524/559; 526/306; 526/318.43; 526/318.44
[58] Field of Search .............. 526/306, 318.43, 318.44; 524/517, 522, 555, 559

[56] References Cited

U.S. PATENT DOCUMENTS

| | | | |
|---|---|---|---|
| 3,875,099 | 4/1975 | Kurth et al. | 526/318.44 |
| 3,926,888 | 12/1975 | Cheung et al. | 526/318.44 |
| 3,980,602 | 9/1976 | Jakubauskas | 526/318.44 |
| 4,041,231 | 8/1977 | Gross et al. | 526/318.44 |
| 4,111,922 | 9/1978 | Beede et al. | 526/306 |
| 4,342,858 | 8/1982 | Herman et al. | 526/318.43 |
| 4,556,686 | 12/1983 | Horvath | 524/517 |
| 4,567,246 | 1/1986 | Gajria | 526/381.44 |

*Primary Examiner*—Joseph L. Schofer
*Assistant Examiner*—Peter D. Mulcahy
*Attorney, Agent, or Firm*—Alvin T. Rockhill

[57] ABSTRACT

This invention relates to a thixotropic thickening agent and to a process for preparing the same. Such thixotropic thickening agents are particularly useful for thickening water reducible coatings. The thixotropic thickening agents of this invention are copolymers which are comprised of repeat units which are derived from methacrylic acid monomer, ethylacrylate monomer, and a water soluble crosslinking agent. The water soluble crosslinking agents which can be used include ethylene glycol dimethacrylate and alkylene bisacrylamides, such as N,N'-methylene bisacrylamide. A neutralized two weight percent aqueous solution of the thixotropic thickening agents of this invention will have a Brookfield RVT viscosity as measured at 50 rpm using a number 3 spindle within the range of 50 to 2000 centipoise (cps).

19 Claims, No Drawings

THIXOTROPIC THICKENING AGENT FOR AQUEOUS SYSTEMS

TECHNICAL FIELD

This invention relates to thixotropic thickening agents for use in aqueous coating systems. For purposes of this patent application, an aqueous coating system is considered to be a colloidal dispersion of a resin in water which can be reduced by the addition of water and which forms a durable coating when applied to a substrate surface. The term aqueous coating system is used herein interchangeably with the term water reducible coating. Other names which are sometimes applied to water reducible coatings are water born, water solubilized, and water dilutable.

BACKGROUND OF THE INVENTION

Most conventional coating resins are insoluble in water. Therefore, in general practice they have been dissolved in a suitable organic solvent or dispersed in water with the aid of an emulsifying agent or surfactant in order to provide a coating composition suitable for application to a substrate surface. A serious disadvantage of organic solvent solutions is that they are potentially toxic, flammable, and environmental pollutants.

Water reducible coatings do not present these problems and are, therefore, highly desirable. For this reason various water reducible coating resins, such as the one described in U.S. Pat. No. 4,474,926, have been developed. Water reducible coatings which utilize such resins have been developed for a variety of purposes, such as highway striping paint.

Conventional thickening agents which are used in organic solvent based coatings do not normally act as thickening agents in aqueous coating systems. Nevertheless, there is a need for thickening agents which can be used in aqueous coating systems. The present invention relates to the development of a thickening agent for use in aqueous coating systems which has thixotropic properties.

SUMMARY OF THE INVENTION

This invention reveals a copolymer which can be utilized as a thixotropic thickening agent for use in aqueous coating systems which is comprised of repeat units which are derived from methacrylic acid monomer, ethylacrylate monomer, and a water soluble crosslinking agent; wherein from 25 to 55 weight percent of the repeat units in said copolymer are derived from ethylacrylate, wherein from 45 to 75 weight percent of the repeat units in said copolymer are derived from methacrylic acid wherein from 0.05 to 0.75 weight percent of the repeat units in said copolymer are derived from said water soluble crosslinking agent, and wherein the Brookfield RVT viscosity of a 2 weight percent solution of said copolymer at a pH within the range of 7 to 8 in water as measured at 50 rpm using a number 3 spindle is within the range of 50 to 2000 mPa·s.

This invention also discloses a process for preparing a copolymer which can be utilized as a thixotropic thickening agent for use in aqueous coating systems which comprises copolymerizing from 25 to 55 phm of ethylacrylate monomer, from 45 to 75 phm of methacrylic acid monomer and from 0.05 to 0.75 phm of a water soluble crosslinking agent so as to produce the copolymer, wherein the Brookfield viscosity of a 2 weight percent solution of said copolymer at a pH within the range of 7 to 8 in water as measured at 50 rpm using a number 3 spindle is within the range of 50 to 2000 mPa·s.

This invention further reveals an aqueous coating composition which is comprised of (a) a water reducible resin which is comprised of, based on 100 weight percent of monomeric units within the water reducible resin: (1) from about 50 to about 90 percent of at least one monomer selected from the group consisting of styrene, α-methyl styrene and vinyl toluene, (2) from about 10 to about 40 of at least one alkyl acrylate monomer wherein the alkyl moiety contains from 3 to 5 carbon atoms, and (3) from about 1 to about 10 percent of at least one unsaturated carbonyl compound selected from the group consisting of acrylic acid, methacrylic acid, fumaric acid, itaconic acid, maleic acid and maleic anhydride; (b) a thixotropic thickening agent which is comprised of repeat units which are derived from methacrylic acid monomer, ethylacrylate monomer, and a water soluble crosslinking agent, wherein from 25 to 55 weight percent of the repeat units in said copolymer are derived from ethylacrylate monomer, wherein from 45 to 75 weight percent of the repeat units in said copolymer are derived from methacrylic acid monomer, and wherein from 0.05 to 0.75 weight percent of the repeat units in said copolymer are derived from said water soluble crosslinking agent; (c) a pigment; (d) a plasticizer; and (e) water.

DETAILED DESCRIPTION OF THE INVENTION

The thixotropic thickening agents of this invention are prepared by copolymerizing methacrylic acid monomer, ethylacrylate monomer, and a water soluble crosslinking agent. The copolymers formed have molecular weights which are sufficient to result in aqueous solutions which contain 2 weight percent of the copolymer to have Brookfield viscosities within the range of 50 to 2000 milliPascal·seconds (mPa·s) as measured at 50 rpm using a number 3 spindle. Brookfield viscosities are measured after the aqueous solutions are neutralized to a pH within the range of 7 to 8. A Brookfield viscosity of at least 50 mPa·s is required in order for the thixotropic thickening agent to have adequate viscosity increasing characteristics. Thickening agents which have Brookfield viscosities of over 2000 mPa·s have poor rheological properties. It is normally preferable for such copolymers to have Brookfield viscosities within the range of 500 to 1500 mPa·s. It is generally more preferable for such copolymers to have Brookfield viscosities within the range of 700 to 1000 mPa·s in order for them to have optimal rheological properties as well as good thickening characteristics.

The copolymers which are utilized as the thixotropic thickening agents of this invention are comprised of repeat units which are derived from methacrylic acid and ethylacrylate. Such copolymers also contain repeat units which are derived from a water soluble crosslinking agent. Such copolymers can be represented by the structural formula:

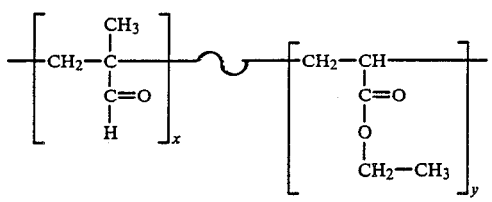
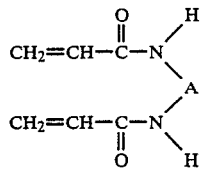

wherein $\frown$ indicates that the repeat units derived from methacrylic acid and ethylacrylate can be distributed in a random manner and wherein x and y represent integers. Normally, from about 25 to 55 weight percent of the repeat units in such copolymers will be derived from ethylacrylate. Accordingly, from about 45 to 75 weight percent of the repeat units in such copolymers will be derived from methacrylic acid. It is generally preferred for such copolymers to have from 30 to 50 weight percent of the repeat units therein being derived from ethylacrylate with 50 to 70 weight percent of the repeat units therein being derived from methacrylic acid. It is normally more preferred for such methacrylic acid/ethylacrylate copolymers to be derived from 35 to 45 weight percent ethylacrylate and from 55 to 65 weight percent methacrylic acid. Normally, from about 0.05 to 0.75 weight percent of the repeat units in such copolymers are derived from a water soluble crosslinking agent. It is normally preferred for 0.1 to 0.3 weight percent of the repeat units in such copolymers to be derived from water soluble crosslinking agents.

The copolymers used as the thixotropic thickening agents of this invention can be prepared utilizing conventional emulsion polymerization techniques. Such emulsion polymerizations are carried out in an aqueous medium which is comprised of water, an emulsifier, methacrylic acid monomer, ethylacrylate monomer, a water soluble crosslinking agent, and a free radical initiator. The emulsifier utilized in such polymerization is typically an ionic emulsifier and the free radical generator utilized is typically a redox system. The polymerization mediums utilized in preparing such copolymers are normally comprised of 200 to 500 parts by weight of water, 25 to 55 parts by weight of ethylacrylate monomer, 45 to 75 parts by weight of methacrylic acid monomer, 0.05 to 0.75 parts by weight of a water soluble crosslinking agent, 1–10 parts by weight of an emulsifier, and from 0.1 to 0.4 parts by weight of an initiator. The polymerization medium utilized will preferably contain 300 to 400 phm (parts per hundred parts by weight of monomer) of water, 2 to 8 phm of emulsifier, and 0.2 to 0.3 phm of the initiator. It is normally preferable for such polymerization mediums to contain from 0.1 to 0.3 phm of a water soluble crosslinking agent. Such polymerization mediums will most preferably contain from 4 to 6 phm of emulsifier.

Any water soluble crosslinking agent containing 2 or more vinyl groups can be utilized for crosslinking. For instance, N,N'-methylene bisacrylamide and polyethylene glycol dimethacrylate can be utilized as crosslinking agents. N,N'-alkylene bisacrylamides are highly preferred crosslinking agents. Such N,N'-alkylene bisacrylamides have the general structural formula:

wherein A is an alkylene group. The alkylene group in such N,N'-alkylene bisacrylamides normally contain from 1 to 8 carbon atoms. More typically the alkylene group in such alkylene bisacrylamides contains from 1 to 4 carbon atoms. Some representative examples of such alkylene groups include methylene, ethylene, propylene, and butylene. N,N'-methylene bisacrylamide is a commercially available alkylene bisacrylamide which is an excellent choice as a crosslinking agent for utilization in practicing the process of this invention. N,N'-methylene bisacrylamide has the structural formula;

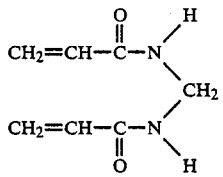

The preferred emulsifiers for use in preparing such copolymers are selected from the group consisting of disodium nonylphenoxy polyethyoxy sulfosuccinate, diammonium nonylphenoxy polyethyoxy sulfosuccinate, sodium lauryl polyethoxy sulfate, and ammonium lauryl polyethoxy sulfate. The sodium lauryl polyethoxy sulfates and ammonium lauryl polyethoxy sulfates which are most preferred for use as emulsifiers have the general structural formula:

wherein M represents sodium or ammonium and wherein n is an integer from 8 to 16 inclusive. The preferred disodium nonylphenoxy polyethoxy sulfosuccinates and diammonium nonylphenoxy polyethoxy sulfosuccinates have the general structural formula:

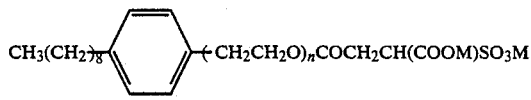

wherein M represents sodium or ammonium and wherein n represents an integer from 8 to 16 inclusive.

The polymerizations utilized in preparing the copolymers of this invention are normally conducted at a polymerization temperature within the range of about 60° F. (15° C.) to about 100° F. (38° C.). It is generally preferable for such polymerizations to be conducted at a temperature within the range of 70° F. (21° C.) to 95° F. (35° C.). In most cases it is more preferable for the polymerization to be carried out at a temperature between 80° F. (27° C.) and 90° F. (32° C.). Such polymerizations are normally conducted without utilizing a modifier, such as t-butyl mercaptan. This is because it has been determined that the utilization properties of the thixotropic thickening agent. The amount of polymerization time required normally ranges between about 0.5 and 10 hours. More commonly, the polymerization time required will be within the range of about 1 to about 4 hours. In most cases a polymerization time of about 2 hours will be appropriate. Such polymerizations are normally carried out to a solids content within the range of 15 to 30 percent. More commonly, a solids content of 20 to 25 percent will be attained. The pH of the polymerization medium utilized is normally in the range of 1.5 to 4.5. In most cases the final pH of the polymerization medium will range from about 3.0 to about 3.5.

The latex containing the crosslinked methacrylic acid-ethylacrylate copolymer can be diluted with water after the crosslinking reaction has been completed. In most industrial applications, the latex will not be diluted. However, the latex can be diluted to a solids content within the range of about 1% to about 10%. In most cases, it will be preferable to dilute the latex to a solids content within the range of 2% to 5%. After the latex is diluted, it is normally desirable to adjust the pH of the latex to within the range of 7 to 10. It is normally preferred for the latex to be adjusted to within the range of 8 to 9. The pH of the latex of the thixotropic thickening agent can be adjusted with any basic neutralizing agent. Sodium hydroxide and potassium hydroxide are preferred bases for utilization in adjusting the pH of the latex, although various amines and other basic materials can be utilized.

Latices containing the thixotropic thickening agent of this invention can be utilized for suspending solid materials in aqueous coating systems. Coating systems containing the thixotropic thickening agents of this invention have a thixotropic character. Aqueous coating systems containing the thixotropic thickening agents of this invention have high build properties and can be applied as thick coatings without sagging. Due to the thixotropic character of such aqueous coating systems, under the high sheer rates encountered in applications by brush, roller, spray, or airless spray, the coatings thin and, therefore, flow and level properly. However, because of its thixotropic character such coatings reform without sagging.

Aqueous coating compositions which contain the thixotropic thickeners of this invention are typically comprised of water, pigments, a water reducible coating resin, a plasticizer, and the thixotropic thickener. Such coating compositions normally contain from about 20 to 60 weight percent water, from about 5 to about 60 weight percent pigments, from about 15 to about 60 weight percent water reducible coating resin, from about 1 to about 6 weight percent plasticizer, and from about 0.5 to 4 weight percent thixotropic thickening agent. The specific amount of water, pigments, coating, resin and plasticizer used in a coating composition will vary greatly and depends upon the application for which it is made (stain, anticorrosion paint, texture coating, high gloss enamel, highway paint, swimming pool paint, etc.) For example, it is generally preferred for stains to be comprised of 35 to 45 weight percent water, from 8 to 15 percent water pigments, from about 40 to 50 weight percent water reducible coating resin, from about 2 to 4 weight percent plasticizer, and from about 1 to 3 weight percent of the thixotropic thickening agent. Other types of coating compositions, such as anticorrosion paints and highway paints, can contain much higher levels of pigments. For example, highway striping paints and anti-corrosion paints can contain 15 to 35 weight percent water, 40 to 60 weight percent pigments, 10 to 30 weight percent coating resins, 1 to 3 weight percent plasticizer, and 1 to 4 weight percent of the thixotropic thickening agent of this invention. Such aqueous coating compositions also commonly contain cosolvents, defoamers, and an antifreeze. For instance, such aqueous coating systems commonly contain from 4 to 8 percent of a cosolvent, from 0.5 to 2 weight percent of an antifreeze, and from 0.5 to 2 weight percent of a defoamer.

The water reducible resin which is utilized in such aqueous coating compositions can be any water reducible resin known to persons skilled in the art for utilization in making water reducible coating compositions. A particularly preferred water reducible resin for utilization in such applications is comprised of repeat units which are derived from (1) at least one monomer selected from the group consisting of styrene. alpha-methylstyrene, and vinyl toluene; (2) at least one alkylacrylate monomer wherein the alkyl moiety contains from 3 to 5 carbon atoms; and (3) at least one unsaturated carbonyl compound selected from the group consisting of acrylic acid, methacrylic acid, fumaric acid, itaconic acid, maleic acid and maleic anhydride. Such water reducible resins typically contain from about 50 to about 90 percent of said members selected from the group consisting of styrene, alpha-methylstyrene, and vinyl toluene; from about 10 to about 40 percent of said alkylacrylate monomers; and from about 1 to about 10 percent of said unsaturated carbonyl compounds, based upon 100 weight percent of monomeric units within the resin. The water reducible resin will most preferably contain from about 65 to about 75 weight percent styrene, from about 20 to 30 weight percent butylacrylate, from about 1 to about 3 weight percent acrylic acid, and from about 0.5 to about 2 weight percent methacrylic acid.

The charge composition utilized in the synthesis of such water reducible coating resins is typically comprised of the appropriate monomers, water, a phosphate-ester surfactant and a free radical initiator. In order to increase the particle size of the resin, the monomers are optimally polymerized in the presence of at least one polyol. The monomer charged composition utilized in such polymerizations normally contains from about 50 to about 90 percent by weight, based on total monomers, of at least one vinyl aromatic monomer selected from the group consisting of styrene, alpha-methylstyrene, and vinyl toluene; from about 10 to about 40 percent by weight, based on total monomers, of an alkylacrylate monomer; and from about 1 to about 10 percent by weight, based on total monomers, of an unsaturated carbonyl compound selected from the group consisting of acrylic acid, methacrylic acid, fumaric acid, itaconic acid, maleic acid and maleic anhydride. The ratio between the total amount of monomers present in the charge composition and water can range between about 0.2:1 and about 1.2:1. It is generally preferred for the ratio of monomers to water in the charge composition to be within the range of 0.8:1 to 1.1:1.

The charge composition also contains from about 1 phm to about 5 phm of a phosphate-ester surfactant. It is generally preferred to utilize 2.5 to 3 phm of the phosphate-ester surfactant. Such phosphate-ester surfactants are commercially available from a wide variety of sources. For instance, some phosphate-ester surfactants which are commercially available include Cafacre-410 (GAF Corporation), Indoil (BASF-Wyandotte Corporation), Emphof (Whitco Chemical Corporation), Cyclophof (Cyclo Chemicals Corporation), Tryfac (Emery Industries), and Alcamet (Lonza Inc).

In order to increase the particle size of the resin, it is highly desirable to include at least one polyol in the charge composition. Normally, from about 0.1 to about 2 phm of a polyol is included in the charge composition. It is preferred for the charge composition to contain 0.03 to 0.4 phm of at least one polyol. It is more preferred for the charge composition to contain about 0.05 phm of a polyol. The polyols that are useful for increasing the particle size of the resin have the structural formula:

wherein n and m are integers and wherein $\sim\!\!\sim\!\!\sim$ indicates that the distribution of repeat units can be random.

The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexance, 1-t-amylazo-1-cyanocyclohexane, and the like, the various alkyl perketals, such as 2,2-bis-(t-butylperoxy)butane, and the like. Water soluble peroxygen free radical initiators are especially useful in such aqueous polymerizations.

After the charge composition is prepared, this emulsion polymerization is carried out at a temperature ranging between about 100° F. (38° C.) and 170° F. (77° C.). It is preferred to conduct the polymerization at a temperature ranging from about 120° F. (50° C.) up to about 150° F. (65° C.). Such polymerizations are generally carried out for a period of time ranging between about 2 hours up to about 24 hours. A polymerization time of 8 to 10 hours is normally preferred.

After the polymerization is completed, the latex formed can be diluted with additional water to the concentration (solids content) that is desired. This latex can be used in the preparation of water reducible coatings which contain the thixotropic thickening agents of this invention using techniques well known to those skilled in the art.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLES 1-5

In this series of experiments five different thixotropic thickening agents were prepared. The thixotropic thickening agents synthesized in this series of experiments differed because varying amounts of crosslinking agent were utilized in their synthesis. The thixotropic thickening agents made in this series of experiments were synthesized in laboratory polymerization bottles.

The polymerization bottles used were changed with 646 g of water, 9.5 g of an ethoxylated lauryl sulfate (surfactant), 68 g of ethylacrylate monomer, 102 g of methacrylic acid monomer, 0.51 g of a 70% aqueous dispersion of t-butylhydroperoxide, 1.7 g of ferrous sulfate solution (an activator), and 0.51 g of sodium formaldehyde sulfoxylate (a reducing agent). N,N'-methylene bisacrylamide was utilized as the crosslinking agent in this series of experiments. The amount of N,N'-methylene bisacrylamide utilized was varied between 0.085 g and 0.425 g (between 0.05 phm and 0.25 phm). The amount of N,N'-methylene bisacrylamide utilized in each of the polymerizations conducted in this series of experiments is shown in Table I.

The polymerization bottles were placed in a constant temperature bath which was maintained at 85° F. (29° C.) immediately after being charged. The polymerizations were allowed to run for a period of about 2 hours which typically resulted in a solids content of about 22%. No coagulum formed in any of the polymerization bottles. Table I shows the final solids content, pH, viscosity, and surface tension of each of the latices prepared in this series of experiments.

TABLE I

| Example | Amount of Crosslinking Agent | Final Solids | pH | Surface Tension |
|---|---|---|---|---|
| 1 | 0.085 g | 21.6 | 3.1 | 58.4 |
| 2 | 0.17 g | 21.6 | 3.3 | 58.0 |
| 3 | 0.255 g | 21.7 | 3.2 | 64.3 |
| 4 | 0.34 g | 21.5 | 3.2 | 63.3 |
| 5 | 0.425 g | 21.6 | 3.2 | 58.6 |

The latices made which contained the thixotropic thickening agents of this invention had outstanding properties as thickening agents for water reducible coatings.

EXAMPLE 6

A water reducible coating was prepared utilizing the latex containing the thixotropic thickening agent prepared in Example 3. The coating prepared was a stain which was made by admixing 57.9 g of ethylene glycol monopropylether (as a cosolvent), 8.8 g of diethylene glycol monomethylether (as an antifreeze), 2.1 g of triethylamine, 10.2 g of a defoamer which was comprised of a mineral oil, emulsifier, and silica derivative (Drew Y-250), 25.9 g of butylbenzyl phosphate (as a plasticizer), 51.7 g of aluminum silicate (pigment), 51.7 g of red iron oxide (pigment), 370 g of Pliolite ® WR-D (a water reducible coating resin), 325 g of water, and 15 g of the thixotropic thickening agent prepared in Example 3. The coating thus prepared had excellent characteristics as a stain for woods. It was painted onto shake shingles. There were no problems encountered in the application. In fact, it was very easy to apply the stain prepared in this experiment to the wood shingles. The shingles which were stained have a very good appearance.

The thixotropic thickener utilized in making the stain made in this experiment provided the stain with a thixotropic character. Accordingly, the stain was easy to apply and provided the shingles stained with a highly satisfactory coating. This example clearly illustrates that the thixotropic thickeners of this invention can be utilized to thicken water reducible coating systems.

EXAMPLE 7

A water reducible anti-corrosion paint was made by admixing 95 g of ethylene glycol monopropylether, 10 g of diethylene glycol monoethylether, 10 g of triethylamine, 10 g of defoamer, 20 g of a chlorinated paraffin (as a plasticizer), 5 g of a dispersing aid, 450 g of Pliolite ® WR-D (a water reducible coating resin), 100 g of titanium dioxide, 25 g of zinc oxide, 250 g of zinc phosphate, 25 g of an organozinc compound (an anti-corrosion pigment), 75 g of a potassium aluminosilicate (an extender pigment), 100 g of water, and 19.7 g of the thixotropic thickening agent prepared in Example 3. The anti-corrosion paint made had a thixotropic character.

The anti-corrosion paint made was painted onto steel panels. There were not problems encountered in the application and the painted panels have a good appearance. This example clearly shows that the thixotropic thickeners of this invention can be used to make water reducible anti-corrosion paints which have a thixotropic character.

EXAMPLE 8

A swimming pool paint was made by admixing 83 g of ethylene glycol monopropyl ether, 11.7 g of triethylamine, 31.4 g of butyl benzyl phosphate, 10 g of diethylene glycol monomethyl ether, 0.3 g of surface active agents, 1.5 g of defoamer, 4.1 g of an alkanolamine titanate, 170.6 g of water, 416.5 g of Pliolite ® WR-D, 228.8 g of titanium dioxide, 70.7 g of silicon dioxide, 16.9 of potassium aluminosilicate, 4 g of a green pigment dispersion, and 13.2 g of a thixotropic thickening agent made by the process specified in Example 3. The swimming pool paint made was determined to be thixotropic in nature.

EXAMPLE 9

A thixotropic thickening agent was made utilizing the procedure specified in Example 2 except that ethylene glycol dimethacrylate was used as the water soluble crosslinking agent in place of the methylene bisacrylamide used in Example 3. A swimming pool paint was then made using the procedure specified in Example 8 except hat 13.8 g of the thixotropic thickening agent which was crosslinked with ethylene glycol dimethacrylate was used in place of the thixotropic thickening agent which was crosslinked with methylene bisacrylamide. The swimming pool paint made had a thixotropic character. This example shows that the thixotropic thickening agents of this invention which are crosslinked with ethylene glycol dimethacrylate can be used to provide water reducible coatings with a thixotropic character.

EXAMPLE 10

A semi-gloss white enamel was made by admixing 56 g of ethylene glycol monopropyl ether, 9 g of diethylene glycol monomethyl ether, 9 g of triethylamine, 10 g of a defoamer, 25 g of a butyl benzyl phosphate plasticizer, 4 g of an alkanolamine titanate, 479 g of Pliolite ® WR-D, 225 g of titanium dioxide, 160 g of water, and 13.2 g of a thixotropic thickening agent made by the process specified in Example 3. The white enamel made was determined to have a thixotropic character.

While certain representative embodiments and details have been shown for the purpose of illustrating the invention, it will be apparent to those skilled in this art that various charges and modifications may be made therein without departing from the scope of the invention.

What is claimed is:

1. A copolymer which can be utilized as a thixotropic thickening agent for use in aqueous coating systems which consists of repeat units which are derived from methacrylic acid monomer, ethylacrylate monomer, and a water soluble crosslinking agent selected from the group consisting of alkylene bisacrylamides and ethylene glycol dimethacrylate; wherein from 25 to 55 weight percent of the repeat units in said copolymer are derived from ethylacrylate, wherein from 45 to 75 weight percent of the repeat units in said copolymer are derived from methacrylic acid wherein from 0.05 to 0.75 weight percent of the repeat units in said copolymer are derived from said water soluble crosslinking agent, and wherein the Brookfield RVT viscosity of a 2 weight percent solution of said copolymer at a pH within the range of 7 to 8 in water as measured at 50 rpm using a number 3 spindle is within the range of 50 to 2000 mPa·s.

2. A process for preparing a copolymer which can be utilized as a thixotropic thickening agent for use in aqueous coating systems which consists of copolymerizing from 25 to 55 phm of ethylacrylate monomer, from 45 to 75 phm of methacrylic acid monomer and from 0.05 to 0.75 phm of a water soluble crosslinking agent selected from the group consisting of alkylene bisacrylamides and ethylene glycol dimethacrylate so as to produce the copolymer, wherein the Brookfield RVT viscosity of a 2 weight percent solution of said copolymer at a pH within the range of 7 to 8 in water as measured at 50 rpm using a number 3 spindle is within the range of 50 to 2000 mPa·s and wherein said copolymer consists essentially of repeat units which are derived from ethylacrylate, methacrylic acid, and said water soluble crosslinking agent.

3. An aqueous coating composition which is comprised of (a) a water reducible resin which is comprised of, based on 100 weight percent of monomeric units within the water reducible resin: (1) from about 50 to about 90 percent of at least one monomer selected from the group consisting of styrene, α-methyl styrene and vinyl toluene, (2) from about 10 to about 40 of at least one alkyl acrylate monomer wherein the alkyl moiety contains from 3 to 5 carbon atoms, and (3) from about 1 to about 10 percent of at least one unsaturated carbonyl compound selected from the group consisting of acrylic acid, methacrylic acid, fumaric acid, itaconic acid, maleic acid and maleic anhydride; (b) a thixotropic thickening agent which is comprised of repeat units which are derived from methacrylic acid monomer, ethylacrylate monomer, and a water soluble crosslinking agent, wherein from 25 to 55 weight percent of the repeat units in said copolymer are derived from ethylacrylate monomer, wherein from 45 to 75 weight percent of the repeat units in said copolymer are derived from methacrylic acid monomer, and wherein from 0.05 to 0.75 weight percent of the repeat units in said copolymer are derived from said water soluble crosslinking agent; (c) a pigment; (d) a plasticizer; and (e) water.

4. A thixotropic thickening agent as specified in claim 1 wherein the repeat units in said copolymer are derived from 30 to 50 weight percent ethylacrylate and from 50 to 70 weight percent methacrylic acid.

5. A thixotropic thickening agent as specified in claim 1 wherein the repeat units in said copolymer are comprised of from 35 to 45 weight percent ethylacrylate and from 55 to 65 weight percent methacrylic acid.

6. A thixotropic thickening agent as specified in claim 1 wherein said water soluble crosslinking agent is an alkylene bisacrylamide.

7. A thixotropic thickening agent as specified in claim 1 wherein said water soluble crosslinking agent is ethylene glycol dimethacrylate.

8. A thixotropic thickening agent as specified in claim 6 wherein the alkylene group in said alkylene bisacrylamide contains from 1 to 8 carbon atoms.

9. A thixotropic thickening agent as specified in claim 8 wherein the repeat units in said copolymer are derived from 30 to 50 weight percent ethylacrylate and from 50 to 70 weight percent methacrylic acid.

10. A thixotropic thickening agent as specified in claim 9 wherein the alkylene group in said alkylene bisacrylamide contains from 1 to 4 carbon atoms.

11. A thixotropic thickening agent as specified in claim 10 wherein the repeat units in said copolymer are comprised of from 35 to 45 weight percent ethylacrylate and from 55 to 65 weight percent methacrylic acid.

12. A thixotropic thickening agent as specified in claim 11 wherein said alkylene bisacrylamide is N,N'-methylene bisacrylamide.

13. A thixotropic thickening agent as specified in claim 12 wherein from 0.1 to 0.3 weight percent of the repeat units in said copolymer are derived from N,N'-methylene bisacrylamide.

14. A process as specified in claim 2 wherein the copolymerization is initiated with a free radical generator which is employed at a concentration within the range of about 0.1 phm to 0.4 phm.

15. A process as specified in claim 14 wherein said copolymerization is carried out at a pH within the range of 1.5 to 4.5.

16. An aqueous coating composition as specified in claim 3 wherein said aqueous coating composition is comprised of from about 20 to about 60 weight percent water, from about 5 to about 60 weight percent pigments, from about 15 to about 60 weight percent of said water reducible resin, from about 1 to about 6 weight percent of the plasticizer, and from about 0.5 to about 4 weight percent of said thixotropic thickening agent.

17. An aqueous coating composition as specified in claim 3 which is in the form of an anti-corrosion paint which is comprised of from about 15 to about 35 weight percent water, from about 40 to about 60 weight percent pigments, from about 10 to about 30 weight percent water reducible coating resins, from about 1 to about 3 weight percent plasticizer, and from about 1 to about 4 weight percent of the thixotropic thickening agent.

18. An aqueous coating composition as specified in claim 3 wherein said aqueous coating composition is in the form of a stain which is comprised of from about 35 to about 45 weight percent water, from about 8 to about 15 weight percent pigments, from about 40 to about 50 weight percent of the water reducible coating resin, from about 2 to about 4 weight percent of the plasticizer, and from about 1 to about 3 weight percent of the thixotropic thickening agent.

19. A process as specified in claim 14 wherein said copolymerization is carried out at a temperature within the range of 21° C. to 35° C. and wherein said copolymerization is carried out at a pH within the range of about 3.0 to about 3.5.

* * * * *